(12) United States Patent
Wei et al.

(10) Patent No.: US 10,318,310 B2
(45) Date of Patent: Jun. 11, 2019

(54) STARTUP ACCELERATING METHOD AND APPARATUS

(71) Applicant: Tencent Technology (Shenzhen) Company Limited, Shenzhen (CN)

(72) Inventors: Xue Wei, Shenzhen (CN); Qianwen Jin, Shenzhen (CN); Wenqiang Wang, Shenzhen (CN); Xuyang Li, Shenzhen (CN); Kang Gao, Shenzhen (CN); Qiru Chen, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 58 days.

(21) Appl. No.: 15/309,095

(22) PCT Filed: May 5, 2015

(86) PCT No.: PCT/CN2015/078290
§ 371 (c)(1),
(2) Date: Nov. 4, 2016

(87) PCT Pub. No.: WO2015/169212
PCT Pub. Date: Nov. 12, 2015

(65) Prior Publication Data
US 2017/0075697 A1    Mar. 16, 2017

(30) Foreign Application Priority Data

May 5, 2014   (CN) .......................... 2014 1 0187308

(51) Int. Cl.
*G06F 15/177*   (2006.01)
*G06F 9/4401*   (2018.01)
*G06F 9/445*    (2018.01)

(52) U.S. Cl.
CPC ............ *G06F 9/4403* (2013.01); *G06F 9/445* (2013.01); *G06F 9/44521* (2013.01); *G06F 9/4406* (2013.01); *G06F 9/4451* (2013.01)

(58) Field of Classification Search
CPC .... G06F 9/4403; G06F 9/445; G06F 9/44521; G06F 9/4451
(Continued)

(56) References Cited

U.S. PATENT DOCUMENTS 6,260,116 B1 *   7/2001   Davis ...................... G06F 9/325
                                                         711/137
6,782,454 B1 *   8/2004   Damron .............. G06F 9/30101
                                                         711/137
(Continued)

FOREIGN PATENT DOCUMENTS

CN        1825283 A       8/2006
CN      102012832 A       4/2011
(Continued)

OTHER PUBLICATIONS

Fang Bin: Method and device for acceleratively starting operating system, and method: Apr. 12, 2012.*
(Continued)

*Primary Examiner* — Jaweed A Abbaszadeh
*Assistant Examiner* — Volvick Derose
(74) *Attorney, Agent, or Firm* — Sughrue Mion, PLLC

(57) ABSTRACT

Described is a startup accelerating method and apparatus. The method includes: obtaining, when it is monitored that a login process of an application is started up, pre-fetched data corresponding to a main process of the application, and loading the obtained pre-fetched data into a cache, the pre-fetched data being obtained according to a historical startup procedure for the main process of the application; stopping, when it is monitored that the startup of the login
(Continued)

process is completed or it is monitored that the main process of the application is started up, obtaining the pre-fetched data corresponding to the main process of the application; and completing a startup procedure of the main process according to the pre-fetched data loaded in the cache. The apparatus includes: an obtaining module, a stopping module and a startup module.

16 Claims, 4 Drawing Sheets

(58) Field of Classification Search
USPC .............................................................. 713/2
See application file for complete search history.

(56) References Cited

U.S. PATENT DOCUMENTS

| | | | | |
|---|---|---|---|---|
| 8,332,570 | B1* | 12/2012 | Cook .................... | G06F 3/0613 711/137 |
| 9,461,980 | B1* | 10/2016 | Agrawal ................. | H04L 63/08 |
| 2002/0019723 | A1* | 2/2002 | Zwiegincew ........... | G06F 12/08 702/186 |
| 2003/0105837 | A1* | 6/2003 | Kamen ............... | H04L 67/2847 709/220 |
| 2004/0205149 | A1* | 10/2004 | Dillon ............... | G06F 17/30902 709/217 |
| 2005/0071617 | A1* | 3/2005 | Zimmer ................ | G06F 9/4401 713/1 |
| 2007/0033588 | A1* | 2/2007 | Landsman ........ | G06F 17/30899 717/178 |
| 2008/0201332 | A1* | 8/2008 | Souders ............ | G06F 17/30867 |
| 2009/0222584 | A1* | 9/2009 | Josefsberg ........ | H04L 29/12066 709/245 |
| 2010/0318707 | A1* | 12/2010 | Tanaka .................. | G06F 13/385 710/267 |
| 2011/0093790 | A1* | 4/2011 | Maczuba .......... | G06F 17/30902 715/745 |
| 2011/0320523 | A1* | 12/2011 | Chan ..................... | G06F 17/301 709/203 |
| 2014/0129814 | A1* | 5/2014 | Bi ......................... | G06F 9/4406 713/1 |
| 2014/0365861 | A1* | 12/2014 | Lasmarias ................. | G06F 9/54 715/234 |
| 2015/0106656 | A1* | 4/2015 | Bian ...................... | G06F 9/445 714/37 |

FOREIGN PATENT DOCUMENTS

| | | | | |
|---|---|---|---|---|
| CN | 102707966 A | * | 4/2012 | ............ G06F 9/445 |
| CN | 102707966 A | | 10/2012 | |
| CN | 104133691 A | | 11/2014 | |
| WO | WO 2013152660 A1 | | 10/2013 | |

OTHER PUBLICATIONS

Extended European Search Report in corresponding European Application No. 15789484.1, dated Mar. 22, 2017 (7 pages).
Chinese Office Action in corresponding Chinese Application No. 2014101873081, dated Feb. 9, 2015 (6 pages), including concise explanation of relevance.
International Search Report issued in corresponding International Application No. PCT/CN2015/078290, dated Jul. 31, 2015 (2 pages).
Written Opinion of the International Searching Authority issued in corresponding International Application No. PCT/CN2015/078290, dated Aug. 3, 2015 (4 pages).
European Office Action; issued in EP Application No. 15 789 484.1-1224; dated Apr. 9, 2018 (5 pgs).

* cited by examiner

STARTUP ACCELERATING METHOD AND APPARATUS

CROSS-REFERENCE TO RELATED APPLICATIONS

This application is the U.S. National Phase application under 35 U.S.C. 371 of International Application PCT/CN2015/078290, filed May 5, 2015, which claims the benefit of priority to Chinese Patent Application No. 201410187308.1, filed on May 5, 2014, the entire contents of which, for each of the aforementioned applications, are hereby incorporated by reference.

FIELD OF THE TECHNOLOGY

The present disclosure relates to the field of the Internet, and in particular to a startup accelerating method and apparatus,

BACKGROUND OF THE DISCLOSURE

With rapid development of Internet technologies, types of applications developed by developers become more, and applications used by users also become more. When a user uses an application, in order to quickly start up the application, a startup procedure of the application needs to be accelerated.

Currently, a startup accelerating procedure is specifically that: when a terminal monitors that the application is started up, a process in a startup procedure of the application is suspended. A disk file of the terminal is searched for corresponding pre-fetched information according to a name of the process and content data of the process, and the pre-fetched information is obtained by monitoring data read by the process from a magnetic disk within a preset period of time. If the pre-fetched information is found, the pre-fetched information is parsed, and a path, an offset value and a length value of data not loaded in a cache are obtained from the pre-fetched information. The corresponding data is pre-fetched according to the obtained path, offset value and length value, and the pre-fetched data is loaded into the cache. In this case, the process is restored, so that the process reads needed data from the cache, and if the cache does not have the needed data, the needed data may be read from the magnetic disk. A speed at which a process reads data from a cache is greater than a speed at which the data is read from a magnetic disk, and therefore startup accelerating is implemented.

Different process startup procedures consume different times, and therefore for different processes, when a terminal pre-fetches data according to pre-fetched information, only data in a preset period of time can be pre-fetched, and when the time consumed by the process startup procedure is less than the preset period of time, the terminal pre-fetches other data except needed data loaded by the process, or When the time consumed by the process startup procedure is greater than the preset period of time, the data pre-fetched by the terminal is less than the needed data loaded by the process. Moreover, when a process is started up, a terminal first suspends the process, and the process is restored after loading of pre-fetched data is completed, and if accuracy of the pre-fetched data is low, which results in a low hit rate of the pre-fetched data, a startup procedure of the process is prolonged.

SUMMARY

In view of the above, embodiments of the present invention provide a startup accelerating method and apparatus. The technical solutions are as follows:

According to an aspect, a startup accelerating method is provided, where the method includes:

obtaining, when it is monitored that a login process of an application is started up, pre-fetched data corresponding to a main process of the application, and loading the pre-fetched data into a cache, the pre-fetched data being obtained according to a historical startup procedure for the main process of the application;

stopping, when it is monitored that the startup of the login process is completed it is monitored that the main process of the application is started up, obtaining the pre-fetched data corresponding to the main process of the application; and completing a startup procedure of the main process according to the pre-fetched data loaded in the cache.

According to another aspect, a startup accelerating apparatus is provided, where the apparatus includes:

a first obtaining module, configured to obtain, when it is monitored that a login process of an application is started up, pre-fetched data corresponding to a main process of the application, and load the pre-fetched data into a cache, the pre-fetched data being obtained according to a historical startup procedure for the main process of the application;

a stopping module, configured to stop, when it is monitored that the startup of the login process is completed or it is monitored that the main process of the application is started up, obtaining the pre-fetched data corresponding to the main process of the application; and a startup module, configured to complete a startup procedure of the main process according to the pre-fetched data loaded in the cache.

In the embodiments of the present invention, the application has a fixed mode, t is, the login process of the application is first started up, and when the login of the login process is completed, the login process enables the main process of the application, and therefore, when the login process just begins to be started up, the pre-fetched data of the main process is obtained, and the pre-fetched data is loaded into the cache. In order to prevent a conflict from being generated between IO requests, when the login of the login process is completed or the main process is started up, the pre-fetched data is stopped from being obtained. In this case, the main process of the application is loaded with the needed data from the cache, and because a speed at which a process reads data from the cache is greater than a speed at which the data is read from the magnetic disk, startup of the application is accelerated. Moreover, the pre-fetched data of the main process is obtained according to the historical startup procedure for the main process of the application, and therefore the pre-fetched data is data read in the complete startup procedure of the main process. Moreover, a procedure of pre-fetching data and the login process are performed at the same time, and when the login of the login process is completed or the main process is started up, the procedure of pre-fetching data is stopped, which does not delay the startup procedure of the main process, and therefore does not prolong the startup procedure of the main process.

BRIEF DESCRIPTION OF THE DRAWINGS

To describe the technical solutions of the embodiments of the present invention more clearly, the accompanying drawings for illustrating the embodiments will be introduced briefly in the following. Apparently, the drawings in the following description are only some embodiments of the present invention, and a person of ordinary skill in the art may obtain other drawings based on these accompanying drawings without creative efforts.

DESCRIPTION OF EMBODIMENTS

To make the objectives, technical solutions, and advantages of the present disclosure more comprehensible, the following further describes the embodiments of the present invention in detail with reference to the accompanying drawings.

The method as disclosed as following may be implemented by any appropriate computing device having one or more processors and memory. The computing device, used herein, may refer to any appropriate device with certain computing capabilities (e.g., of controlling media data to be placed at a constant speed), such as a personal computer (PC), a work station computer, a hand-held computing device (tablet), a mobile terminal (a mobile phone or a smart phone), a sever, a network server, a smart terminal, or any other user-side or server-side computing device. The memory includes storage medium, which may further include memory modules, e.g., a read-only memory (ROM), a random access memory (RAM), and flash memory modules, and mass storages, e.g., a CD-ROM, a U-disk, a removable hard disk, etc, which are all non-transitory storage mediums. The storage medium may be a non-transitory computer readable storage medium that stores program modules for implementing various processes, when executed by the processors.

Figure 1:
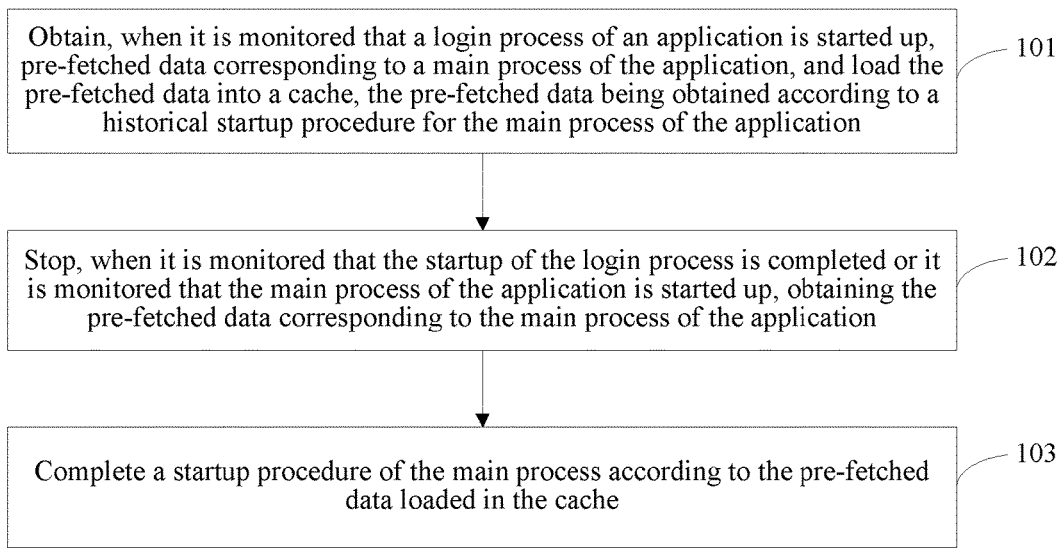
FIG. 1 is a flowchart of a startup accelerating method according to an embodiment of the present invention.

FIG. 1 is a flowchart of a startup accelerating method according to an embodiment of the present invention. Referring to FIG. 1, the method includes:

Step 101: Obtain, When it is monitored that a login process of an application is started up, pre-fetched data corresponding to a main process of the application, and load the pre-fetched data into a cache, the pre-fetched data being obtained according to a historical startup procedure for the main process of the application.

Step 102: Stop, when it is monitored that the startup of the login process is completed or it is monitored that the main process of the application is started up, obtaining the pre-fetched data corresponding to the main process of the application.

Step 103: Complete a startup procedure of the main process according to the pre-fetched data loaded in the cache.

Optionally, the obtaining pre-fetched data corresponding to a main process of the application, and loading the pre-fetched data into a cache includes:

obtaining pre-fetched information corresponding to the main process of the application according to an identifier of the login process;

reading corresponding data from a disk file according to the pre-fetched information; and determining that the read data is the pre-fetched data corresponding to the main process of the application, and loading the pre-fetched data into the cache.

Optionally, the obtaining pre-fetched information corresponding to the main process of the application according to an identifier of the login process includes:

obtaining a main process identifier of the application according to the identifier of the login process;

determining a storage path of the pre-fetched inform ion corresponding to the main process according to the main process identifier; and obtaining the pre-fetched information corresponding to the main process according to the storage path of the pre-fetched information corresponding to the main process.

Optionally, the reading corresponding data from a disk file according to the pre-fetched information includes:

parsing the pre-fetched information to obtain parsed pre-fetched information;

forming data information of a specific data structure by the parsed pre-fetched information, the data information including a tile path, an offset value and a length value of needed data of the main process of the application; and reading corresponding data from the disk file according to the file path, the offset value and the length value.

Further, the method further includes:

calculating a startup progress of the main process according to a size of total data corresponding to the pre-fetched information and a size of loaded data of the main process in the startup procedure of the main process of the application;

calculating an accelerated time of the main process according to a startup consumed time of the main process, the size of the loaded data of the main process, a size of the pre-fetched data and the startup progress; and displaying the startup progress and the accelerated time of the main process.

Optionally, before the obtaining, when it is monitored that a login process of an application is started up, pre-fetched data corresponding to a main process of the application, and loading the pre-fetched data into a cache, the method further includes:

monitoring the historical startup procedure of the main process of the application, and obtaining startup data of the application;

obtaining, according to the startup data, an offset value and a length of data read by the main process from a magnetic disk in the startup procedure; and generating pre-fetched information according to a file path of a tile at which the startup data is located, the offset value and the length value.

Optionally, before the obtaining, when it is monitored that a login process of an application is started up, pre-fetched data corresponding to a main process of the application, and loading the obtained pre-fetched data into a cache, the method further includes:

receiving input/output (IO) training data, the IO training data including file data and a relative file path of a file at which file data corresponding to the main process is located;

converting, according to an installation path of the main process in a terminal, the relative file path of the file at which the file data corresponding to the main process is located into a corresponding absolute file path;

converting the file data into a corresponding offset value and a corresponding length value; and generating pre-fetched information according to the absolute file path, the offset value and the length value.

In this embodiment of the present invention, the application has a fixed mode, that is, the login process of the application is first started up, and when the login of the login process is completed, the login process enables the main process of the application, and therefore, when the login process just begins to be started up, the pre-fetched data of the main process is obtained, and the pre-fetched data is loaded into the cache. In order to prevent a conflict from being generated between IO requests, when the login of the login process is completed or the main process is started up, the pre-fetched data is stopped from being obtained. In this case, the main process of the application is loaded with the needed data from the cache, and because a speed at which a process reads data from the cache is greater than a speed at which the data is read from the magnetic disk, startup of the application is accelerated. Moreover, the pre-fetched data of the main process is obtained according to the historical startup procedure for the main process of the application, and therefore the pre-fetched data is data read in the complete startup procedure of the main process. Moreover, a procedure of pre-fetching data and the login process are performed at the same time, and when the login of the login process is completed or the main process is started up, the procedure of pre-fetching data is stopped, which does not delay the startup procedure of the main process, and therefore does not prolong the startup procedure of the main process.

Figure 2:
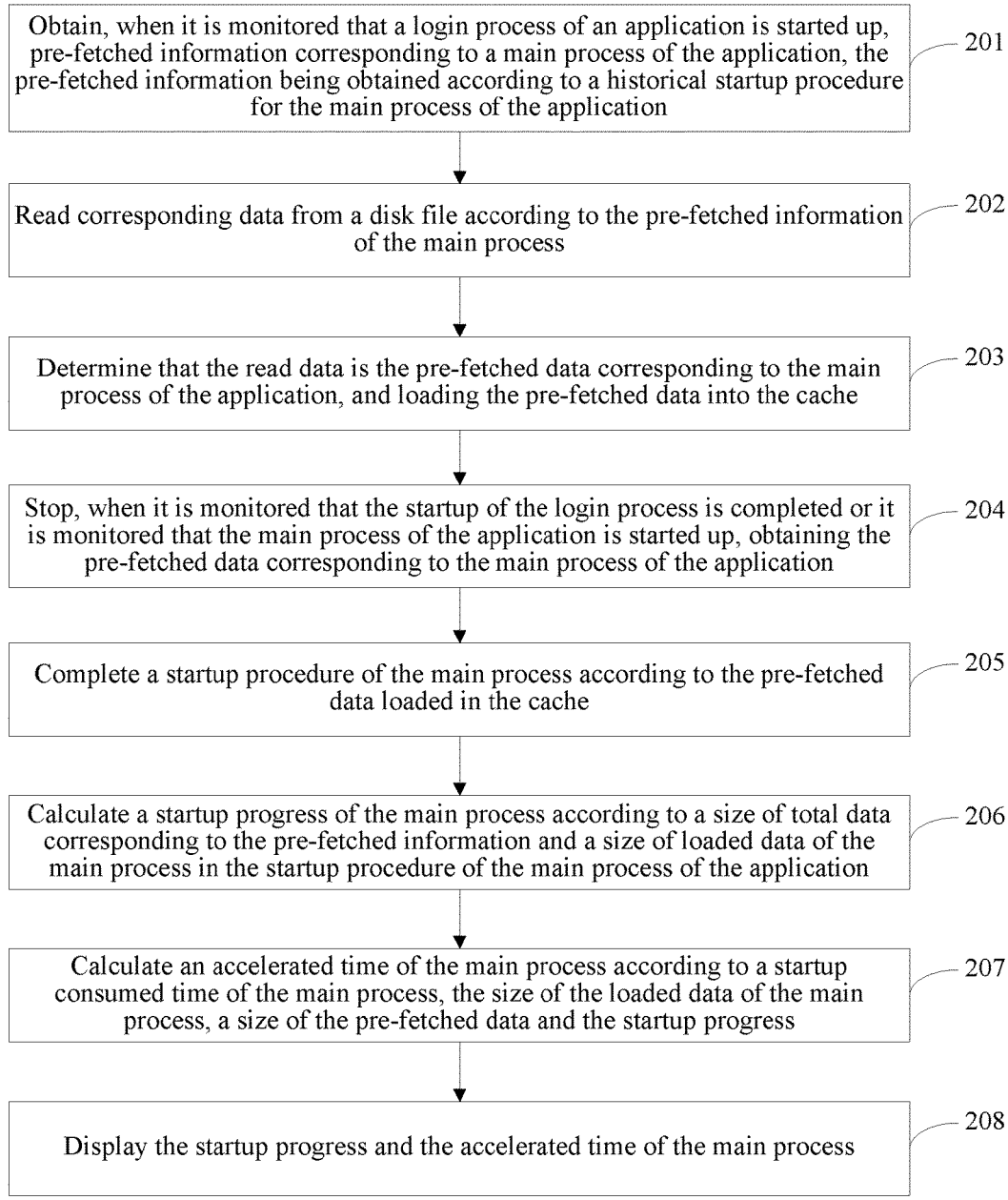
FIG. 2 is a flowchart of another startup accelerating method according to an embodiment of the present invention.

FIG. 2 is a flowchart of a startup accelerating method according to an embodiment of the present invention. Referring to FIG. 2, the method includes:

Step 201: Obtain, when it is monitored that a login process of an application is started up, pre-fetched information corresponding to a main process of the application, the pre-fetched information being obtained according to a historical startup procedure for the main process of the application.

Specifically, when it is monitored that a login process of an application is started up, a main process identifier of the application is obtained according to an identifier of the login process; a storage path of the pre-fetched information corresponding to the main process is determined according to the main process identifier; and the pre-fetched information corresponding to the main process is obtained according to the storage path of the pre-fetched information corresponding to the main process.

The specific operation of obtaining a main process identifier of the application according to an identifier of the login process may be: obtaining a corresponding application identifier from a stored correspondence between an application identifier and a login process identifier according to the identifier of the login process; and obtaining a corresponding main process identifier from a stored correspondence between an application identifier and a main process identifier according to the application identifier.

When the login process and the main process are started up, an operating system creates the login process and the main process, and the operating system allocates respective identifiers to the login process and the main process, that is, a login process identifier and a main process identifier. The login process identifier may uniquely identify the login process, and the login process identifier may be the name of the login process; the main process identifier may also uniquely identify the main process, and the main process identifier may be the name of the main process.

The specific operation of determining a storage path of the pre-fetched information corresponding to the main process according to the main process identifier may be: obtaining content data of an execution file corresponding to the main process according to the main process identifier. A file name of a file at which the pre-fetched information corresponding to the main process is located is determined according to the main process identifier and the content data of the execution file corresponding to the main process, and a storage path of the pre-fetched information corresponding to the main process is determined according to the file name. For example, the storage path may be an application installation directory \*.pref The pre-fetched information is stored in a file included by a terminal, and the storage path of the pre-fetched information may be found according to the file name.

In this embodiment of the present invention, a condition of triggering obtaining pre-fetched information corresponding to the main process of the application not only may be monitoring startup of the login process of the application, but also may be triggering obtaining the pre-fetched information corresponding to the main process of the application when window display is detected, and certainly, may further be other manners, and is not specifically limited in this embodiment of the present invention.

Further, in this embodiment of the present invention, the pre-fetched information may be obtained by the terminal by monitoring the historical startup procedure of the main process of the application; or a terminal corresponding to an operator may also start up the main process beforehand, monitor the startup procedure of the main process, obtain IO training data, and deliver the IO training data to a terminal corresponding to the user, an that the terminal corresponding to the user generates the pre-fetched information.

When the pre-fetched information is obtained by the terminal by monitoring the historical startup procedure of the main process of the application, the specific procedure of generating the pre-fetched information is: monitoring the historical startup procedure of the main process of the application, and obtaining startup data of the application; obtaining, according to the startup data, an offset value and a length value of data read by the main process from a magnetic disk in the startup procedure; and generating pre-fetched information according to a file path of a file at which the startup data is located, the offset value and the length value.

The specific operation of obtaining, according to the starup data, an offset value and a length value of data read by the main process from a magnetic disk in the startup procedure may be: obtaining a hard page default event from the startup data, analyzing the hard page default event, and. obtaining startup IO data, the startup IO data including the offSet value and the length value of the data read by the main process from the magnetic disk in the startup procedure.

When a terminal corresponding to an operator may also start up the main process beforehand, monitor the startup procedure of the main process, obtain IO training data, and deliver the IO training data to a terminal corresponding to the user, no that the terminal corresponding to the user generates the pre-fetched information, the specific operation of generating the pre-fetched information by the terminal be: receiving IO training data, the IO training data including file data and a relative tile path of a file at which file data corresponding to the main process is located. A relative file path of a file at which the file data is located is obtained from the IO training data, and the relative file path of the file at which the file data corresponding to the main process is located is converted into a corresponding absolute file path according to an installation path of the main process in the terminal corresponding to the user. Moreover, the file data in the IO training data is converted into a corresponding offset value and a corresponding length value; and pre-fetched information is generated according to the absolute file path, the offset value and the length value.

For example, the relative file path may be that the file is in a file which is under an installation file of the application, and the absolute file path may be that the file is under a file which is in a magnetic disk which is in the terminal.

After the terminal generates the pre-fetched information, the pre-fetched information is store is, the pre-fetched information is corresponding to a storage path.

Figure 3:
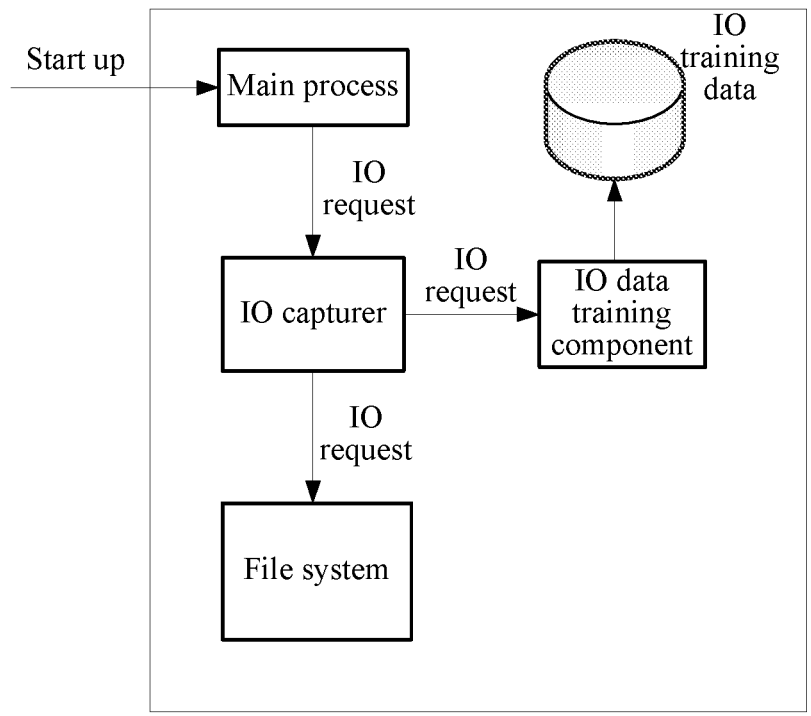
FIG. 3 is a schematic diagram of generating IO training data according to an embodiment of the present invention.

As shown in FIG. 3, the specific operation that a terminal corresponding to an operator starts up the main process beforehand, monitors the startup procedure of the main process, and obtains IO training data may be: the operator may start up the main process beforehand, and after the main process is started up, the main process may send an IO request to a file system; in this case, an capturer monitors the main process, obtains the IO request, and sends the IO request to an IO data training component. The IO data training component obtains, according to the IO request, data read by the main process from a magnetic disk in the startup procedure, and determines that the read data is startup data of the application. A hard page default event is obtained from the startup data, the hard page default event is analyzed, and startup IO data is obtained, the startup IO data including the offset value and the length value of the data read by the main process from the magnetic disk in the startup procedure. The startup IO data is converted into file data, that is, the offset value and the length value are converted into corresponding file locations data corresponding to the main process of the application is selected from the file data according to an installation path of the main process of the application and a file path of a file at Which the file data is located. An absolute file path of a file at which the file data corresponding to the main process is located is converted into a relative file path. Neighboring file data is merged, and IO training data is generated according to the merged file data and the relative file path of the file at which the file data corresponding to the main process is located, File locations corresponding to the startup IO data may he bit locations occupied by the startup IO data in the file. For example, the startup IO data includes three data blocks, a file location corresponding to a first data block is the $1^{st}$ bit to the $15^{th}$ bit in the tile, a tile location corresponding to a second data block is the $15^{th}$ bit to the $25^{th}$ bit in the file, and a file location corresponding to a third data block is the $30^{th}$ bit to the $45^{th}$ bit in the file. When neighboring file data is merged, because the bit location of the first data block is connected to the bit location of the second data block, the first data block is neighboring to the second data block, and the first data block and the second data block may be merged into one data block, that is, the file location corresponding to the merged data block is the $1^{st}$ bit to the $25^{th}$ bit in the file.

The specific operation that file data corresponding to the main process of the application is selected from the file data according to an installation path of the main process of the application and a file path of a file at which the file data is located may be: the installation path of the main process of the application is compared with the file path of the file at which the file data is located, and if the file path of the file at which the file data is located is located under the installation path of the main process of the application, it is determined that the file data is the file data corresponding to the main process of the application. If the file path of the file at which the file data is located is not located under the installation path of the main process of the application, it is determined that the file data is not the file data corresponding to the main process of the application.

Further, when the application is updated, IO training data may be generated again according to the foregoing step, and it is determined according to the newly generated IO training data whether a pre-fetching effect achieves a preset effect, and if yes, the IO training data may be published, so that a user updates pre-fetched information according to the IO training data.

The specific operation of determining according to the newly generated IO training data whether a pre-fetching effect achieves a preset effect may be: obtaining corresponding pre-fetched data according to the IO training data, and completing the startup procedure of the main process according to the obtained pre-fetched data. It is determined whether the time consumed by the startup procedure of the main process is less than or equal to a preset threshold, and if yes, it is determined that the pre-fetching effect achieves the preset effect; otherwise, it is determined that the pre-fetching effect does not achieve the preset effect.

Step 202: Read corresponding data from a disk file according to the pre-fetched information of the main process.

Specifically, the pre-fetched information of the main process is parsed to obtain parsed pre-fetched information; data information of a specific data structure is formed by the parsed pre-fetched information, the data information including a file path, an offset value and a length value of needed data of the main process of the application; and corresponding data is read from the disk file according to the file path, the offset value and the length value.

A module reading corresponding data from the disk file according to the pre-fetched information of the main process may be a kernel pre-fetching function module, and the data information of the specific data structure is data information that the kernel pre-fetching function module can identify. The kernel pre-fetching function module may pre-fetch data according to an interface provided by an operating system.

The specific operation of reading corresponding data from the disk file according to the file path, the offset value and the length value may be: determining an initial location of to-be-read data in the magnetic disk according to the file path and the offset value. Data whose length is the length value is read from the initial location, The file path is the foregoing absolute file path.

For example, a correspondence between an offiet value and a length included in the pre-fetched information may be shown in the following table 1.

TABLE 1

| Offset value | Length value |
| --- | --- |
| 0 | 5 |
| 15 | 10 |
| 30 | 10 |

It may be determined according to the file path and the offset value 0 in the pre-fetched information that the initial location of the to-be-read data in the magnetic disk is a location 1, and data whose length is 5 is read starting from the location 1. It may be determined according to the file path and the offset value 15 that the initial location of the to-be-read data in the magnetic disk is a location 2, and data Whose length is IO is read starting from the location 2. It may be determined according to the file path and the offset value 30 that the initial location of the to-be-read data in the magnetic disk is a location 3, and data whose length is IO is read starting from the location 3.

Step 203: Determine that the read data is the pre-fetched data corresponding to the main process of the application, and load the pre-fetched data into the cache.

The pre-fetched data may be loaded into an idle location in the cache.

The pre-fetched data is data needed when the main process of the application is started up, and therefore, before the main process is started up, the pre-fetched data may be loaded into the cache. When the main process is started up, the main process may directly read needed data from the cache.

Step 204: Stop, when it is monitored that the startup of the login process is completed or it is monitored that the main process of the application is started up, obtaining the pre-fetched data corresponding to the main process of the application.

When startup of the login process is completed, the login process enables the main process of the application. Therefore, when it is monitored that the startup of the login process is completed or it is monitored that the main process of the application is started up, the pre-fetched data corresponding to the main process of the application is stopped from being obtained.

The login process performs information interaction with a network side, the pre-fetched data pert:bans IO request interaction with the operating system of the terminal, and the main process of the application also performs IO request interaction with the operating system of the terminal, and therefore, in order to prevent a conflict from being generated between an IO request of the pre-fetched data and an IO request of the main process of the application, when the main process of the application is started up, the pre-fetched data corresponding to the main process of the application is stopped from being obtained.

Further, a condition of triggering stopping obtaining the pre-fetched data corresponding to the main process of the application may also be that window display is detected, that is, when a window displayed when startup of the login process is completed is detected, the pre-fetched data corresponding to the main process of the application is stopped from being obtained, or, when a window displayed when the main process is started up is detected, the pre-fetched data corresponding to the main process of the application is stopped from being obtained, which is not specifically limited in the embodiments of the present invention.

Step 205: Complete a startup procedure of the main process according to the pre-fetched data loaded in the cache.

A speed at which a process reads data from a cache is greater than a speed at which the data is read from a magnetic disk, and therefore the main process reads needed data from the pre-fetched data loaded in the cache, and the speed at which the main process reads data may be increased, thereby accelerating startup of the application.

The time of pre-fetching data is equal to the time of the startup procedure of the login process, and When the size of total data corresponding to the pre-fetched information is greater than the size of pre-fetched data of the terminal in a period of time corresponding to the startup procedure of the login process, the terminal does not pre-fetch all data corresponding to the pre-fetched information in the period of time, and therefore, in the startup procedure of the main process, if the cache has no needed data of the startup procedure of the main process, the main process may further read the needed data from the magnetic disk.

Step 206: Calculate a startup progress of the main process according to a size of total data corresponding to the pre-fetched information and a size of loaded data of the main process in the startup procedure of the main process of the application.

Specifically, in the startup procedure of the main process of the application, the size of the loaded data of the main process is divided by the size of the total data corresponding to the pre-fetched information, to obtain the startup progress of the main process according to.

The pre-fetched information is obtained according to data read by the main process in the entire startup procedure.

Step 207: Calculate an accelerated time of the main process according to a startup consumed time of the main process, the size of the loaded data of the main process, a size of the pre-fetched data and the startup progress.

Specifically, the accelerated time of the main process is calculated based on the following formula (1) according to the startup consumed time of the main process, the size of the loaded data of the main process, the size of the pre-fetched data and the startup progress.

$$T = \frac{t}{z_1} \times z_2 \times s \qquad (1)$$

where in the foregoing formula (1), T is the accelerated time of the main process, t is the startup consumed time of the main process, $z_1$ is the size of the loaded data of the main process, $z_2$ is the size of the pre-fetched data of the main process, and s is the startup progress.

In this embodiment of the present invention, the size of the pre-fetched data is less than or equal to the size of the total data corresponding to the pre-fetched information.

Step 208: Display the startup progress and the accelerated time of the main process.

Figure 4:
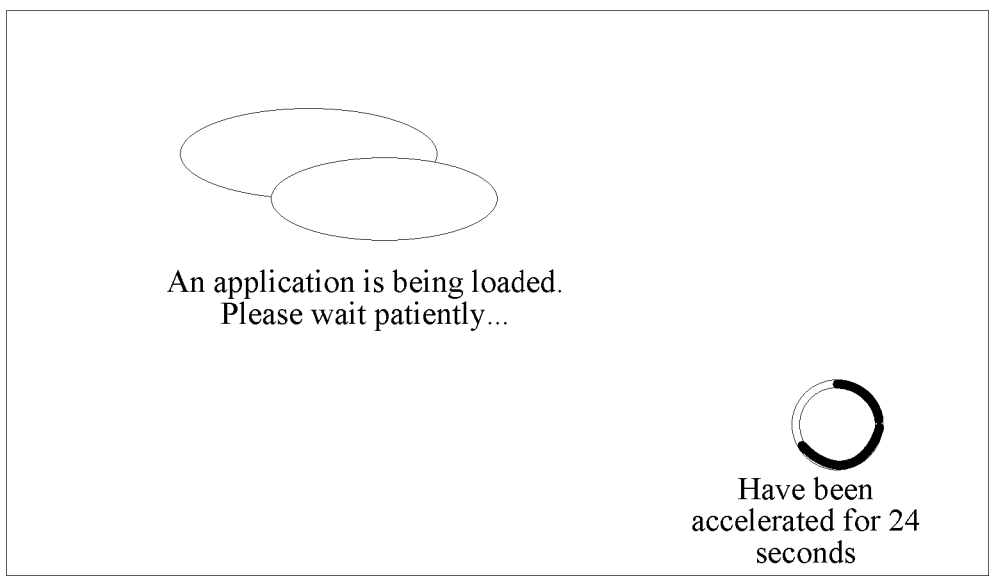
FIG. 4 is a schematic structural diagram of an application display interface according to an embodiment of the present invention.

The startup progress and the accelerated time of the main process may be displayed on a display interface of the application. The startup progress and the accelerated time of the main process are displayed in diversified forms, and forms of displaying the startup progress and the accelerated time of the main process are not specifically limited in this embodiment of the present invention. For example, FIG. 4 shows an application display interface, where the application display interface may display an icon of the application, and loading prompt information of the main process, and the startup progress and the accelerated time of the main process are displayed at a bottom right corner of the display interface. An outer circle of the icon at the bottom right corner may indicate the startup progress of the main process, and the accelerated time of the main process is indicated by using words below the icon at the bottom right corner. For example, when the accelerated time is 24 seconds, the 24 seconds may be displayed on the application display interface shown in FIG. 4.

In this embodiment of the present invention, the application has a fixed mode, that is, the login process of the application is first started up, and when the login of the login process is completed, the login process enables the main process of the application, and therefore, when the login process just begins to be started up, the pre-fetched data of the main process is obtained according to the pre-fetched information of the main process, and the pre-fetched data is loaded into the cache. In order to prevent a conflict from being generated between IO requests. When the login of the login process is completed or the main process is started up, the pre-fetched data is stopped from being obtained. In this case, the main process of the application is loaded with the needed data from the cache, and because a speed at which a process reads data from the cache is greater than a speed at which the data is read from the magnetic disk, startup of the application is accelerated. Moreover, the pre-fetched data of the main process is obtained according to the historical startup procedure for the main process of the application, and therefore the pre-fetched data is data read in the complete startup procedure of the main process. Moreover, a procedure of pre-fetching data and the login process are performed at the same time, and when the login of the login process is completed or the main process is started up, the procedure of pre-fetching data is stopped, which does not delay the startup procedure of the main process, and therefore does not prolong the startup procedure of the main process.

Figure 5:
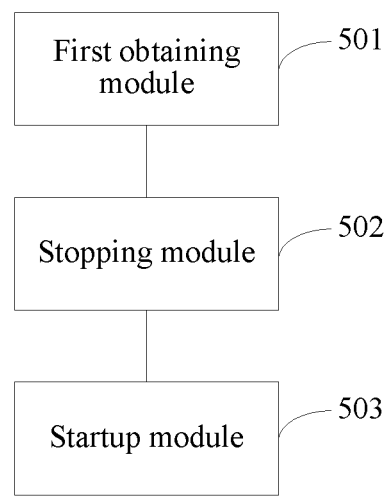
FIG. 5 is a schematic structural diagram of a startup accelerating apparatus according to an embodiment of the present invention.

FIG. 5 is a schematic structural diagram of a startup accelerating apparatus according to an embodiment of the present invention. Referring to FIG. 5, the apparatus includes:

a first obtaining module 501, configured to obtain, when it is monitored that a login process of an application is started up, pre-fetched data corresponding to a main process of the application, and load the pre-fetched data into a cache, the pre-fetched data being obtained according to a historical startup procedure for the main process of the application;

a stopping module 502, configured to stop, when it is monitored that the startup of the login process is completed or it is monitored that the main process of the application is started up, obtaining the pre-fetched data corresponding to the main process of the application; and a startup module 503, configured to complete a startup procedure of the main process according to the pre-fetched data loaded in the cache.

Optionally, the first obtaining module 501 includes:

an obtaining unit, configured to obtain pre-fetched information corresponding to the main process of the application according to identifier of the login process;

a reading unit, configured to read corresponding data from a disk file according to e pre-fetched information; and a loading unit, configured to determine that the read data is the pre-fetched data corresponding to the main process of the application, and load the pre-fetched data into the cache.

The obtaining unit includes:

a first obtaining subunit, configured to obtain a main process identifier of the application according to the identifier of file login process;

a determining subunit, configured to determine a storage path of the pre-fetched information corresponding to the main process according to the main process identifier; and a second obtaining subunit, configured to obtain the pre-fetched information corresponding to the main process according to the storage path of the pre-fetched information corresponding to the main process.

The reading unit includes:

a parsing subunit, configured to parse the pre-fetched information to obtain parsed pre-fetched information;

a forming subunit, configured to form data information of a specific data structure by the parsed pre-fetched information, the data information including a file path, an offset value and a length value of needed data of the main process of the application; and a reading subunit, configured to read corresponding data from the disk file according to the file path, the offset value and the length value.

Further, the apparatus further includes:

a first calculating module, configured to calculate a startup progress of the main process according to a size of total data corresponding to the pre-fetched information and a size of loaded data of the main process in the startup procedure of the main process of the application;

a second calculating module, configured to calculate an accelerated time of the main process according to a startup consumed time of the main process, the size of the loaded data of the main process, a size of the pre-fetched data and the startup progress; and a display module, configured to display the startup progress and the accelerated time of the main process.

Optionally, the apparatus further includes:

a monitoring module, configured to monitor the historical startup procedure of the main process of the application, and obtain startup data of the application;

a second obtaining module, configured to obtain, according to the startup data, an offset value and a length value of data read by the main process from a magnetic disk in the startup procedure; and a first generating module, configured to generate pre-fetched information according to a file path of a file at which the startup data is located, the offset value and the length value.

Optionally, the apparatus further includes:

a receiving module, configured to receive input/output (IO) training data, the IO training data including file data and a relative file path of a file at which file data corresponding to the main process is located;

a first converting module, configured to convert, according to an installation path of the main process in a terminal, the relative file path of the file at which the file data corresponding to the main process is located into a corresponding absolute file path;

a second converting module, configured to convert the file data into a corresponding offset value and a corresponding length value; and a second generating module, configured to generate pre-fetched information according to the absolute file path, the offset value and the length value.

In this embodiment of the present invention, the application has a fixed mode, that is, the login process of the application is first started up, and when the login of the login process is completed, the login process enables the main process of the application, and therefore, when the login process just begins to be started up, the pre-fetched data of the main process is obtained, and the pre-fetched data is loaded into the cache. In order to prevent a conflict from being generated between IO requests, when the login of the login process is completed or the main process is started up, the pre-fetched data is stopped from being obtained. In this case, the main process of the application is loaded with the needed data from the cache, and because a speed at which a process reads data from the cache is greater than a speed at which the data is read from the magnetic disk, startup of the application is accelerated. Moreover, the pre-fetched data of the main process is obtained according to the historical startup procedure for the main process of the application, and therefore the pre-fetched data is data read in the complete startup procedure of the main process. Moreover, a procedure of pre-fetching data and the login process are performed at the same time, and When the login of the login process is completed or the main process is started up, the procedure of pre-fetching data is stopped, which does not delay the startup procedure of the main process, and therefore does not prolong the startup procedure of the main process.

It should be noted that when the startup accelerating apparatus provided by the embodiment accelerates startup, description is made only through examples of division of the functional modules. :In an actual application, the functions may be assigned according to needs to be implemented by different functional modules, that is, the internal structure of the apparatus is divided into different functional modules, so as to implement all or a part of the functions described above. Furthermore, the embodiment of the startup accelerating apparatus provided by the embodiments belongs to the same idea as the embodiment of the startup accelerating method, and the method embodiment may serve as a reference for details of a specific implementation process thereof, which are not repeated herein.

The sequence numbers of the preceding embodiments of the present invention are merely for description purpose but do not indicate the preference of the embodiments.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present disclosure. Any modification, equivalent replacement, or improvement derived within the spirit and principle of the present disclosure shall fall within the protection scope of the present disclosure.

The invention claimed is:

1. A startup accelerating method, comprising:
    obtaining, when it is monitored that a login process of an application is started up, pre-fetched data corresponding to a main process of the application;
    loading the pre-fetched data into a cache, the pre-fetched data being obtained according to a historical startup procedure for the main process of the application;
    stopping, when it is monitored that a startup of the login process is completed or it is monitored that the main process of the application is started up, obtaining the pre-fetched data corresponding to the main process of the application; and
    completing a startup procedure of the main process according to the pre-fetched data loaded in the cache,
    wherein the obtaining pre-fetched data corresponding to a main process of the application, comprises:
        obtaining pre-fetched information corresponding to the main process of the application according to an identifier of the login process, wherein the identifier of the login process is a name of the login process;
        reading corresponding data from a disk file according to the pre-fetched information; and
        determining that the read data is the pre-fetched data corresponding to the main process of the application,
    wherein a time period of obtaining the pre-fetched data is equal to a time period of performing the startup procedure of the login process, and
    wherein, when a size of the pre-fetched data obtained in the startup procedure of the login process is less than a size of total data corresponding to the pre-fetched information at a time of monitoring that a startup of the login process is completed or at a time of monitoring that the main process of the application is started up, a remaining portion of the total data corresponding to the pre-fetched information is not pre-fetched.

2. The method according to claim 1, wherein the obtaining pre-fetched information corresponding to the main process of the application according to the identifier of the login process comprises:
    obtaining a main process identifier of the application according to the identifier of the login process;
    determining a storage path of the pre-fetched information corresponding to the main process according to the main process identifier; and
    obtaining the pre-fetched information corresponding to the main process according to the storage path of the pre-fetched information corresponding to the main process.

3. The method according to claim 1, wherein the reading corresponding data from the disk file according to the pre-fetched information comprises:
    parsing the pre-fetched information to obtain parsed pre-fetched information;
    forming data information of a specific data structure by the parsed pre-fetched information, the data information comprising a file path, an offset value and a length value of needed data of the main process of the application; and
    reading the corresponding data from the disk file according to the file path, the offset value and the length value.

4. The method according to claim 1, wherein the method further comprises:
    calculating a startup progress of the main process according to the size of the total data corresponding to the pre-fetched information and a size of loaded data of the main process in the startup procedure of the main process of the application;
    calculating an accelerated time of the main process according to a startup consumed time of the main process, the size of the loaded data of the main process, the size of the pre-fetched data, and the startup progress, the accelerated time indicating a reduction in the startup consumed time that is saved based on the size of the pre-fetched data; and
    displaying the startup progress and the accelerated time of the main process.

5. The method according to claim 4, wherein the accelerated time of the main process is calculated based on the following formula:

$$T = t/z_1 \times z_2 \times s,$$

wherein T is the accelerated time of the main process, t is the startup consumed time of the main process, $z_1$ is the size of the loaded data of the main process, $z_2$ is the size of the pre-fetched data of the main process, and s is the startup progress.

6. The method according to claim 4, wherein the startup progress is calculated by dividing the size of the loaded data of the main process by the size of the total data corresponding to the pre-fetched information.

7. The method according to claim 1, wherein before the obtaining, when it is monitored that the login process of the application is started up, the pre-fetched data corresponding to the main process of the application, the method comprises:

monitoring the historical startup procedure of the main process of the application, and obtaining startup data of the application;

obtaining, according to the startup data, an offset value and a length value of data read by the main process from a magnetic disk in the startup procedure; and generating pre-fetched information according to a file path of a file at which the startup data is located, the offset value and the length value.

8. The method according to claim 1, wherein before the obtaining, when it is monitored that the login process of the application is started up, the pre-fetched data corresponding to the main process of the application, the method comprises:

receiving input/output (IO) training data, the IO training data comprising file data and a relative file path of a file at which file data corresponding to the main process is located;

converting, according to an installation path of the main process in a terminal, the relative file path of the file at which the file data corresponding to the main process is located into a corresponding absolute file path;

converting the file data into a corresponding offset value and a corresponding length value; and generating pre-fetched information according to the corresponding absolute file path, the corresponding offset value and the length value.

9. The method according to claim 1, wherein the method further comprises, when the size of the pre-fetched data obtained in the startup procedure of the login process is less than the size of the total data corresponding to the pre-fetched information:

reading, from a magnetic disk, the remaining portion of the total data corresponding to the pre-fetched information that has not been pre-fetched, in the startup procedure of the main process; and completing the startup procedure of the main process according to the pre-fetched data loaded in the cache and the remaining portion read from the magnetic disk in the startup procedure of the main process.

10. A startup accelerating apparatus, comprising:

a processor and a non-transitory storage, wherein the non-transitory storage stores machine readable instructions, and the processor executes the machine readable instructions stored in the non-transitory storage to:

obtain, when it is monitored that a login process of an application is started up, pre-fetched data corresponding to a main process of the application, and load the pre-fetched data into a cache, the pre-fetched data being obtained according to a historical startup procedure for the main process of the application;

stop, when it is monitored that the startup of the login process is completed or it is monitored that the main process of the application is started up, obtaining the pre-fetched data corresponding to the main process of the application; and complete a startup procedure of the main process according to the pre-fetched data loaded in the cache;

wherein the processor executes the machine readable instructions stored in the non-transitory storage to:

obtain pre-fetched information corresponding to the main process of the application according to an identifier of the login process, wherein the identifier of the login process is a name of the login process;

read corresponding data from a disk file according to the pre-fetched information; and determine that the read data is the pre-fetched data corresponding to the main process of the application, and load the pre-fetched data into the cache, wherein a time period of obtaining the pre-fetched data is equal to a time period of performing the startup procedure of the login process, and wherein, when a size of the pre-fetched data obtained in the startup procedure of the login process is less than a size of total data corresponding to the pre-fetched information at a time of monitoring that a startup of the login process is completed or at a time of monitoring that the main process of the application is started up, a remaining portion of the total data corresponding to the pre-fetched information is not pre-fetched.

11. The apparatus according to claim 10, wherein the processor executes the machine readable instructions stored in the non-transitory storage to:

obtain a main process identifier of the application according to the identifier of the login process;

determine a storage path of the pre-fetched information corresponding to the main process according to the main process identifier; and obtain the pre-fetched information corresponding to the main process according to the storage path of the pre-fetched information corresponding to the main process.

12. The apparatus according to claim 10, wherein the processor executes the machine readable instructions stored in the non-transitory storage to:

parse the pre-fetched information to obtain parsed pre-fetched information;

form data information of a specific data structure by the parsed pre-fetched information, the data information comprising a file path, an offset value and a length value of needed data of the main process of the application; and read corresponding data from the disk file according to the file path, the offset value and the length value.

13. The apparatus according to claim 10, wherein the processor executes the machine readable instructions stored in the non-transitory storage to:

calculate a startup progress of the main process according to the size of the total data corresponding to the pre-fetched information and a size of loaded data of the main process in the startup procedure of the main process of the application;

calculate an accelerated time of the main process according to a startup consumed time of the main process, the size of the loaded data of the main process, the size of the pre-fetched data and the startup progress, the accelerated time indicating a reduction in the startup consumed time that is saved based on the size of the pre-fetched data; and display the startup progress and the accelerated time of the main process.

14. The apparatus according to claim 10, wherein the processor executes the machine readable instructions stored in the non-transitory storage to:

monitor the historical startup procedure of the main process of the application, and obtain startup data of the application;

obtain, according to the startup data, an offset value and a length value of data read by the main process from a magnetic disk in the startup procedure; and generate pre-fetched information according to a file path of a file at which the startup data is located, the offset value and the length value.

15. The apparatus according to claim 10, wherein the processor executes the machine readable instructions stored in the non-transitory storage to:
receive input/output (IO) training data, the IO training data comprising file data and a relative file path of a file at which file data corresponding to the main process is located;
convert, according to an installation path of the main process in a terminal, the relative file path of the file at which the file data corresponding to the main process is located into a corresponding absolute file path;
convert the file data into a corresponding offset value and a corresponding length value; and
generate pre-fetched information according to the corresponding absolute file path, the corresponding offset value and the length value.

16. A non-transitory computer readable storage medium having stored therein one or more instructions, which, when executed by a computing device, cause the computing device to:
obtaining, when it is monitored that a login process of an application is started up, pre-fetched data corresponding to a main process of the application;
loading the pre-fetched data into a cache, the pre-fetched data being obtained according to a historical startup procedure for the main process of the application;
stopping, when it is monitored that the startup of the login process is completed or it is monitored that the main process of the application is started up, obtaining the pre-fetched data corresponding to the main process of the application; and
completing a startup procedure of the main process according to the pre-fetched data loaded in the cache;
wherein the obtaining pre-fetched data corresponding to a main process of the application, comprises:
obtaining pre-fetched information corresponding to the main process of the application according to an identifier of the login process, wherein the identifier of the login process is a name of the login process;
reading corresponding data from a disk file according to the pre-fetched information; and
determining that the read data is the pre-fetched data corresponding to the main process of the application,
wherein a time period of obtaining the pre-fetched data is equal to a time period of performing the startup procedure of the login process, and
wherein, when a size of the pre-fetched data obtained in the startup procedure of the login process is less than a size of total data corresponding to the pre-fetched information at a time of monitoring that a startup of the login process is completed or at a time of monitoring that the main process of the application is started up, a remaining portion of the total data corresponding to the pre-fetched information is not pre-fetched.

* * * * *